United States Patent Office 3,252,891
Patented May 24, 1966

3,252,891
OXIDATION OF MERCAPTANS
William K. T. Gleim, Island Lake, Ill., assignor to Universal Oil Products Company, Des Plaines, Ill., a corporation of Delaware
No Drawing. Filed Aug. 28, 1964, Ser. No. 392,948
15 Claims. (Cl. 208—206)

This invention relates to an improvement in the oxidation of mercaptans using a phthalocyanine catalyst. The phthalocyanine catalyst is very effective for the oxidation of mercaptans and is particularly advantageous for use in the sweetening of sour hydrocarbon distillates. Sweetening of the sour hydrocarbon distillate produces a treated product containing less mercaptans than contained in the sour distillate.

Sour hydrocarbon distillates differ widely in their compositions, depending upon the source of the oil from which the distillate is derived and possibly upon the different methods used in processing the oil to produce the distillate. The differences in composition include a difference in the type of mercaptans contained in the distillate and also a difference in the type and quantity of other non-hydrocarbon impurities contained in the distillate. While the phthalocyanine catalysts is very effective for catalyzing the sweetening of most sour hydrocarbon distillates, some sour hydrocarbon distillates contain high boiling tertiary mercaptans and cannot be sweetened readily even when using the very effective phthalocyanine catalyst. Furthermore, some sour hydrocarbon distillates also contain other non-hydrocarbon distillates which apparently cause discoloration of the sweetened distillate. The present invention offers an improvement in the phthalocyanine catalyst sweetening process whereby the difficultly oxidizable mercaptans are more readily converted to disulfides and at the same time discoloration of the treated product is reduced.

As hereinbefore set forth, the novel process of the present invention is particularly applicable to the oxidation of the more difficultly oxidizable mercaptans. In general, the more difficultly oxidizable mercaptans are the higher boiling tertiary mercaptans and these are most likely contained in the higher boiling hydrocarbon distillates including kerosene, jet fuel, aromatic solvent, stove oil, range oil, gas oil, diesel fuel, fuel oil, lubricating oil, etc. Accordingly, the present invention is of particular advantage for use in the treatment of such sour hydrocarbon distillates. However, it also may be used for the sweetening of other sour hydrocarbon distillates including gasoline, naphtha, normally gaseous hydrocarbon fractions, etc., as well as for the oxidation of substantially pure mercaptan fractions or for the oxidation of mercaptans contained in other substrates. In another embodiment the novel features of the present invention may be utilized for purifying other organic liquids containing mercaptans. The other organic liquids include alcohols, etc.

The present invention offers a novel process which improves the oxidation of mercaptans, either as such or contained in various substrates. This improved process not only effects oxidation of the readily oxidizable mercaptans but also effects oxidation of the difficultly oxidizable mercaptans which is not readily accomplished in conventional processes. These advantages result in improved sweetening of sour hydrocarbon distillates containing the more difficultly oxidizable mercaptans and thereby permit the treated product to meet specifications. Furthermore, the novel process of the present invention will, when desired, effect substantially complete conversion of mercaptans and thereby produce a treated product substantially free of mercaptans. Another important advantage of the novel process is that undesirable discoloration which inherently occurs in conventional processes is minimized.

In one embodiment the present invention relates to a process for oxidizing a mercaptan which comprises reacting said mercaptan with an oxidizing agent in the presence of a phthalocyanine catalyst, an ion of mercury and an ion selected from the group consisting of thiosulfate and cyanide.

In another embodiment the present invention relates to a method of sweetening a sour hydrocarbon distillate which comprises reacting said distillate with air in the presence of an alkaline reagent, cobalt phthalocyanine sulfonate, mercury and sodium thiosulfate.

As will be shown by the appended examples, the phthalocyanine catalyst is very effective in sweetening sour hydrocarbon distillate. This sweetening is further improved by the presence of mercury ions in the reaction. The sweetening is even further improved by the presence of thiosulfate or cyanide ions, in addition to the mercury and phthalocyanine catalyst. While not intended to be limited thereto, it is believed that the mercury is oxidized to the ion by air under the influence of the phthalocyanine catalyst. The mercury ion reacts with the mercaptan or fragment of the mercaptan to form a sulfide of mercury or other compound containing mercury and sulfur, including one or more of mercuric sulfide, mercurous sulfide, etc. Thus, there is co-action between the phthalocyanine catalyst and the mercury. However, the thiosulfate or cyanide ions are believed to complex with the mercury to maintain the mercury ions in solution and thereby render them more readily available for reaction with the mercaptans. Thus, it is seen that the association of the phthalocyanine catalyst, mercury ions and thiosulfate or cyanide ions all co-act to produce improved results in the oxidation of mercaptans.

Any suitable phthalocyanine catalyst is used in the present invention and preferably comprises a metal phthalocyanine. Particularly preferred metal phthalocyanines comprise cobalt phthalocyanine and vanadium phthalocyanine. The metal phthalocyanine in general is not readily soluble in aqueous solutions and, therefore, for improved operation is preferably utilized as a derivative thereof. A preferred derivative is the sulfonated derivative. Thus, a particularly preferred phthalocyanine catalyst comprises cobalt phthalocyanine sulfonate. Such a catlayst comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

Elemental mercury or any mercury compound which is converted to mercury ions in the environment of the sweetening process may be used in accordance with the present invention. Elemental mercury and a number of different mercury compounds have been used satisfactorily for this purpose. Accordingly, reference to mercury in the present specifications and claims is intended to include elementary mercury or mercury compounds. Illustrative mercury compounds include mercuric acetate, mercuric propionate, mercuric butyrate, phenyl mercury acetate, tetra-(acetoxymercury) furan, etc. In another embodiment inorganic mercury compounds may be used including mercuric carbonate, mercuric chloride, mercuric fluoride, mercuric iodate, mercuric iodide, mercuric nitrate, mercuric phosphate, as well as various mixed mercury compounds as methylmercuric chloride, methylmercuric iodide, phenylmercuric chloride, phenylmercuric nitrate, tolylmercuric chloride, naphthylmercuric chloride, etc. It is understood that any suitable mercuric compound may be employed and that the different mercury compounds are not necessarily equivalent when used for the sweetening of the same or different substrate. The particular mercury compound to be used will be selected with regard to the particular oxidation to be accomplished and generally upon the cost and availability of the mercury compound.

Any soluble thiosulfate or cyanide compound may be used in accordance with the present invention. Because the sweetening process normally is effected in an alkaline medium, the thiosulfate and cyanide preferably comprise a salt having a basic cation. A particularly preferred thiosulfate is sodium thiosulfate. Another preferred compound is potassium thiosulfate. Other alkali metal thiosulfates include lithium thiosulfate, rubidium thiosulfate, cesium thiosulfate. However, the latter thiosulfates generally are more expensive and therefore are not usually preferred for commercial use. Alkaline earth metal thiosulfates include calcium thiosulfate, strontium thiosulfate, barium thiosulfate. Another thiosulfate comprises ammonium thiosulfate. Still another thiosulfate is magnesium thiosulfate. It is understood that the above thiosulfates and various hydrated forms thereof may be employed in accordance with the present invention.

Any soluble cyanide compound may be used in accordance with the present invention. A particularly preferred cyanide is sodium cyanide. Another preferred cyanide is potassium cyanide. Other cyanides include lithium cyanide, rubidium cyanide, cesium cyanide, calcium cyanide, strontium cyanide, barium cyanide, ammonium cyanide, magnesium cyanide, etc.

It is understood that any suitable thiosulfate or cyanide may be employed and that the different compounds are not necessarily equivalent for use in the sweetening of the same or different substrates. Here again, the particular thiosulfate or cyanide to be used will be selected with regard to the particular oxidation to be accomplished and also with regard to the cost and availability thereof.

In a preferred embodiment, oxidation of the mercaptan is effected in the presence of an alkaline solution. Any suitable alkaline reagent is employed. A preferred reagent comprises an aqueous solution of an alkali metal hydroxide such as sodium hydroxide (caustic) or potassium hydroxide. Other alkaline solutions include aqueous solutions of lithium hydroxide, rubidium hydroxide, cesium hydroxide, etc., although, in general, these hydroxides are more expensive and therefore usually are not preferred for commercial use. Preferred alkaline solutions are aqueous solutions of from about 1% to about 50% and more particularly from about 5% to about 25% by weight concentration of the alkali metal hydroxide. While water is the preferred solvent, it is understood that the other suitable solvents may be used including, for example, alcohols, etc., and preferably aqueous mixtures of these solvents.

The phthalocyanine catalyst, mercury or mercury compound and thiosulfate or cyanide are used in small concentrations. These concentrations are best expressed in terms related to the alkaline solution. Accordingly, the phthalocyanine catalyst is used in a range of from about 5 to about 1,000 and preferably from about 10 to about 200 parts per million by weight of the alkaline solution, although lower or higher concentrations may be used in some cases. In general the use of higher concentrations is unnecessary, but, if desired, may range up to 1% or more by weight of the alkaline solution. The concentration of mercury or mercury compound will be selected with regard to the mercaptan content of the sour substrate and may be within the range of from about 0.002% to about 0.5% and more particularly from about 0.01% to about 0.002% by weight of the alkaline solution. Although, here again, a lower concentration down to about 0.001% by weight or a higher concentration which may range up to 1% or more by weight of the alkaline solution may be used when satisfactory for the purpose. The thiosulfate or cyanide will be selected with regard to the concentration of mercury and may be within the range of from about 0.005% to about 10% and more particularly from about 0.05% to about 5% by weight of the alkaline solution. Here again, a lower or higher concentration may be used when satisfactory for the purpose.

It appears that the mercury is consumed in the course of the process. Accordingly, when desired, additional mercury and/or mercury compound may be added continuously or intermittently during the course of the process. Similarly, additional phthalocyanine catalyst and thiosulfate or cyanide may be added, either continuously or intermittently, during the course of the process.

Treating of the sour hydrocarbon distillate is effected by oxidation of mercaptans. Accordingly, an oxidizing agent is present in the reaction. Air is preferred, although oxygen or other oxygen-containing gas may be utilized. In some cases the sour petroleum distillate may contain entrained oxygen or air in sufficient concentration to accomplish the desired sweetening, but usually it is preferred to introduce air into the reaction. The amount of air must be sufficient to effect oxidation of mercaptans, although a moderate excess thereof generally is not objectionable.

Oxidation of mercaptans and/or sweetening of sour hydrocarbon distillates or other sour substrates in the presence of the phthalocyanine catalyst and mercury ions is effected at any suitable temperature which may range from ambient (50°–90° F.) to 200° F. when operating at atmospheric pressure or up to 400° F. or more when operating at superatmospheric pressure. In general, it is preferred to utilize a slightly elevated temperature which may range from 100° F. to about 175° F. Atmospheric pressure or superatmospheric pressure, which may range up to 1000 pounds or more, may be used.

Treatment of the petroleum distillate is effected in any suitable manner and may be in a batch or continuous process. In a batch process the sour hydrocarbon distillate is introduced into a reaction zone containing the phthalocyanine catalyst, alkaline reagent, mercury or mercury compound, and thiosulfate or cyanide, and air is introduced therein or passed therethrough. The reaction zone preferably is equipped with suitable stirrers or other mixing devices to obtain intimate mixing of the reactants. In a continuous process, the caustic solution containing the phthalocyanine catalyst, mercury or mercury compound and thiosulfate or cyanide is passed countercurrently to, or concurrently with, the sour petroleum distillate into a reaction zone, to which a continuous stream of air also is passed. In a mixed type process, the reaction zone contains the alkaline solution, phthalocyanine catalyst, mercury or mercury compound and thiosulfate or cyanide, and the sour distillate and air are passed continuously therethrough and removed, generally from the upper portion of the reaction zone.

In another embodiment of the present invention a colloidal suspension of mercury is prepared and used in this manner. The colloidal suspension of mercury may be produced by violently stirring liquid mercury in the presence of an hydroxy acid, such as citric acid, tartaric acid, etc., or in the presence of a dye which forms a lake as, for example, acid, basic or mordant dyes.

In another embodiment of the invention, the catalyst is disposed as a fixed bed in the oxidation zone and the mercaptan, hydrocarbon distillate or other substrate containing the mercaptan is passed, together with alkaline solution, mercury or mercury compound and thiosulfate or cyanide, at the desired temperature and pressure, into contact with the catalyst in either upward or downward flow. In this embodiment, the catalyst is prepared as a composite with a solid support. Any suitable support may be employed and preferably comprises activated charcoal, coke or other suitable forms of carbon. In some cases the support may comprise silica, alumina, magnesia, etc., or mixtures thereof. In one method, preformed particles of the solid support are soaked in a solution containing the catalyst, after which excess solution is drained off and the catalyst is used as such or is subjected to a drying treatment, mild heating, blowing with air, hydrogen, nitrogen, etc., or successive treatments using two or more of these treatments prior to use. In other methods of preparing the solid composite, a solution of the phthalocyanine catalyst may be sprayed or poured over the particles of the solid support, or such particles may be dipped, suspended, immersed or otherwise contacted with the catalyst solution. The concentration of phthalocyanine catalyst in the composite may range from 0.01% to 10% by weight or more of the composite.

Regardless of the particular operation employed, the products are separated to recover disulfides and/or hydrocarbon distillate of reduced mercaptan content, as well as to separate alkaline reagent solution for reuse in the process. In the liquid type process the alkaline reagent solution contains the phthalocyanine catalyst, thiosulfate or cyanide and mercury or mercury compound. As hereinbefore set forth, additional phthalocyanine catalyst, mercury or mercury compound and/or thiosulfate or cyanide may be comingled with the alkaline solution and the mixture then is recycled for further use in the process. In the fixed bed type of process, the alkaline solution will contain mercury or mercury compound and thiosulfate or cyanide and may be recycled for further use in the process, preferably with additional mercury or mercury compound and/or additional phthalocyanine catalyst and additional thiosulfate or cyanide if required.

As hereinbefore set forth, the mercury sulfide forms as an insoluble precipitate and may be separated from the alkaline solution in any conventional manner including, for example, filtering, centrifugal separation, etc. The mercury sulfide, recovered in this manner, may be regenerated in any suitable manner as, for example, by distillation over iron filings, iron powder, etc., or other suitable catalyst. The mercury, recovered in this manner, then may be reused in the process for the oxidation of mercaptans.

In some cases and particularly in the treatment of sour gasoline, a major proportion of the mercaptans is first removed from the gasoline by extraction with an alkaline solution, and particularly caustic solution, or by any conventional sweetening process. In one method, this treatment is accomplished by either passing the sour gasoline in countercurrent contact with a descending stream of caustic solution or by passing the sour gasoline through a body of caustic solution. The gasoline or other hydrocarbon distillate still contains mercaptans and then is treated with the phthalocyanine catalyst, mercury and thiosulfate or cyanide in the manner herein described. This serves to lower the amount of mercury which will be consumed in the process. In another embodiment, the sour hydrocarbon distillate may be treated with air, alkaline solution and phthalocyanine catalyst in the absence of mercury and thiosulfate or cyanide in a first step and the treated distillate from this step then is treated with the phthalocyanine catalyst, mercury and thiosulfate or cyanide in the manner herein described to effect further reduction in the mercaptan content of the distillate. This serves to reduce the consumption of mercury. Also, when desired, the caustic solution used in the extraction of mercaptans many be subjected to regeneration to oxidize the sodium mercaptides to form disulfides and to recover the caustic for reuse in the process.

The following examples are introduced to illustrate further the novelty and utility of the present invention but not with the intention of unduly limiting the same.

*Example I*

A series of experiments were performed in batch runs in a 2,000 ml. round-bottom flask equipped with a vibromixer and a side inlet for air. At the start of each run 500 ml. of kerosene and 500 ml. of an aqueous phase was added to the flask. In the runs made in accordance with the present invention, the aqueous phase consisted of 10% sodium hydroxide solution, 20 parts per million of cobalt phthalocyanine sulfonate catalyst, 90 parts per million of mercury ions (as mercuric acetate) and 1% by weight of sodium thiosulfate. The cobalt phthalocyanine sulfonate was composited with a carbon support and was in the form of powder. Although the flask was open to the atmosphere, air was bubbled into the solution periodically in order to insure that adequate dissolved oxygen was present in the system. The reaction mixture was agitated at room temperature. Periodically an aliquot sample was withdrawn from the kerosene phase and analyzed by titration with silver ion.

The kerosene used in this series of runs was a commercial kerosene having an API gravity at 60° F. of 43.8, a boiling range of 363° to 500° F. and a mercaptan sulfur content of 424 parts per million.

For comparative purposes, control runs were made in the same manner except for the specific composition of the aqueous phase. These runs serve to demonstrate the advantages of the improved process of the present invention.

In run No. 1, the aqueous solution consisted only of 10% sodium hydroxide solution. After 90 minutes of reaction in the manner described above, the mercaptan sulfur content of the kerosene was reduced to 235 parts per million.

Run No. 2 was made in the same manner as run No. 1 except that 90 parts per million of mercury ions (as mercuric acetate) was included in the aqueous alkaline solution. This apparently had no effect whatsoever in the sweetening of the kerosene because, after 90 minutes of reaction, the mercaptan sulfur content also was 235 parts per million which, it will be noted, is the same concentration as obtained in run No. 1.

Run No. 3 was made in the same manner as described above except that the aqueous alkaline phase also contained 20 parts per million of cobalt phthalocyanine sulfonate catalyst but did not contain the mercuric acetate. After 90 minutes of reaction the mercaptan sulfur content was reduced to 19 parts per million. It will be noted that the cobalt phthalocyanine catalyst did serve to considerably reduce the mercaptan sulfur content of the kerosene.

Run No. 4 was made in the same manner as described above except that the aqueous alkaline solution contained 20 parts per million of cobalt phthalocyanine catalyst and 126 parts per million of mercury ions (as mercuric acetate). After 60 minutes of reaction, the mercaptan sulfur content was reduced to 4 parts per million.

Run No. 5 was made in the same manner as described in run No. 4 except that the aqueous alkaline solution also contained 1% by weight of sodium thiosulfate. After 40 minutes of reaction the mercaptan sulfur content was reduced to only 1 part per million.

It will be noted that in run No. 5 the mercaptan sulfur content was reduced to 1 part per million in 40 minutes of reaction time. Accordingly, as hereinbefore set forth, it is believed that the sodium thiosulfate served to complex the mercury and to maintain more mercury ions in solution, thereby resulting in further improvement in the oxidation of mercaptans.

*Example II*

Another series of runs were made in substantially the same manner as described in Example I except that the aqueous solution contained 10% by weight of sodium hydroxide, 100 parts per million of cobalt phthalocyanine sulfonate, 200 parts per million of mercury ions and 5% by weight of sodium thiosulfate. Different mercury compounds were used to supply the mercury ions.

In run No. 6, elemental mercury was used as the source of mercury ions. After 40 minutes of reaction in the manner described above, the mercaptan sulfur content of the kerosene was reduced to 4 parts per million.

In run No. 7, phenylmercuric acetate was used as the source of mercury ions and, after 60 minutes of reaction in the manner described above, the mercaptan sulfur content was reduced to 9.4 parts per million.

From the above examples it will be noted that the use of both mercury and sodium thiosulfate, in association with the phthalocyanine catalyst, effectively reduced the mercaptan sulfur content of the kerosene to a very low value.

*Example III*

As hereinbefore set forth, sweetening of sour kerosene in accordance with the present invention did not cause deterioration of the color of the sweetened kerosene which otherwise occurs when sweetening is effected in the absence of the mercury and thiosulfate. The exact reason for this is not known, but it could be postulated that either the sweetening is accomplished so rapidly that the secondary reactions which cause discoloration do not have the necessary time under reaction conditions to occur, or that the mercury, thiosulfate and phthalocyanine catalyst co-act to reduce the secondary reactions which cause discoloration. The absence of discoloration has been noted in the runs made in accordance with the present invention as described in Examples I and II. Two other commercial kerosenes also were sweetened in accordance with the present invention and the absence of discoloration was noted.

Run No. 8 was made in accordance with the present invention using as charge a commercial kerosene having an initial mercaptan sulfur content of 232 parts per million and an original Saybolt color of 13. The sweetened kerosene was aged for 24 hours at 200° F. and the Saybolt color of the sweetened kerosene was 12.

Run No. 9 was made in the same manner using a different commercial kerosene having an original mercaptan sulfur content of 48 parts per million and an original Saybolt color of 26. After sweetening in accordance with the present invention and storage at 200° F. for 24 hours, the sweetened kerosene had a Saybolt color of 26.

*Example IV*

Another series of runs were made in substantially the same manner as described in Example I except that potassium cyanide was used instead of sodium thiosulfate and a different commercial kerosene having a mercaptan sulfur content of 384 parts per million was used as the charge.

In run No. 10, the aqueous phase contained 10% by weight of sodium hydroxide, 100 parts per million of cobalt phthalocyanine sulfonate, 200 parts per million of mercury and 0.4% by weight of potassium cyanide. After reaction for 50 minutes in the manner described previously, the mercaptan sulfur content of the kerosene was reduced from 384 parts per million to only 1.6 parts per million.

Run No. 11 was made in the same manner as described in run No. 9 except that the concentration of potassium cyanide was reduced to only 0.041% by weight of the aqueous alkaline solution. In this run, after 50 minutes of reaction in the manner described previously, the mercaptan sulfur content was reduced to the very low amount of only 0.64 part per million.

*Example V*

Aromatic solvent containing mercaptans is treated in the presence of vanadium phthalocyanine sulfonate, mercury ions and potassium thiosulfate at 120° F. and 50 pounds per square inch in a batch type operation. The sour aromatic solvent, 15° Baumé potassium hydroxide solution, 50 parts per million of vanadium phthalocyanine sulfonate catalyst, 0.05% by weight of mercuric acetate and 0.05% by weight of potassium thiosulfate (the phthalocyanine catalyst, mercury and thiosulfate being based on the potassium hydroxide solution) are charged to a closed reaction zone equipped with a stirring blade to effect intimate mixing and agitated to effect sweetening of the aromatic solvent. After completion of the reaction, the aromatic solvent is recovered from the reaction mixture and is of reduced mercaptan content and of acceptable color.

*Example VI*

Sour jet fuel is sweetened by being passed, in admixture with sodium hydroxide, mercury, sodium cyanide and air downwardly through a zone containing cobalt phthalocyanine sulfonate catalyst as a fixed bed in a reaction zone, at a temperature of 150° F. and a pressure of 100 pounds per square inch. The effluent products from the reaction zone are passed into a settling zone, where excess air is vented and the sweetened jet fuel is separated from the aqueous phase. The aqueous phase is filtered to remove the mercury sulfide precipitate, and the filtrate is recycled for further use in the process.

I claim as my invention:

1. A method which comprises reacting a mercaptan with free oxygen in contact with a phthalocyanine catalyst, an ion of mercury and an ion selected from the group consisting of thiosulfate and cyanide.

2. A method which comprises reacting a mercaptan with air in contact with a phthalocyanine catalyst, elemental mercury and an ion selected from the group consisting of thiosulfate and cyanide.

3. A method which comprises reacting a mercaptan with air in contact with a phthalocyanine catalyst, an ion of mercury, and an ion selected from the group consisting of thiosulfate and cyanide.

4. A method which comprises reacting a mercaptan with air in contact with a phthalocyanine catalyst, mercury ion and sodium thiosulfate.

5. A method which comprises reacting a mercaptan with air in contact with a phthalocyanine catalyst, mercury ion and potassium thiosulfate.

6. A method which comprises reacting a mercaptan with air in contact with a phthalocyanine catalyst, mercury ion and sodium cyanide.

7. A method which comprises reacting a mercaptan with air in the presence of a phthalocyanine catalyst, mercury ion and potassium cyanide.

8. A method of sweetening a sour hydrocarbon distillate which comprises reacting mercaptans contained in said distillate with air in contact with an alkaline solution, phthalocyanine catalyst, an ion of mercury and an ion selected from the group consisting of thiosulfate and cyanide.

9. A method of sweetening a sour hydrocarbon distillate which comprises reacting mercaptans contained in said distillate with air in contact with a caustic solution, cobalt phthalocyanine sulfonate catalyst, mercury ion and sodium thiosulfate.

10. A method of sweetening a sour hydrocarbon distillate which comprises reacting mercaptans contained in said distillate with air in contact with potassium hydroxide solution, cobalt phthalocyanine sulfonate catalyst, mercury ion and potassium thiosulfate.

11. A method of sweetening a sour hydrocarbon distillate which comprises reacting mercaptans contained in said distillate with air in contact with sodium hydroxide solution, cobalt phthalocyanine sulfonate catalyst, mercury ion and sodium cyanide.

12. A method of sweetening a sour hydrocarbon distillate which comprises reacting mercaptans contained in said distillate with air in contact with an alkaline solution, vanadium phthalocyanine sulfonate catalyst, mercury ion and sodium thiosulfate.

13. A method of sweetening a sour hydrocarbon distillate which comprises reacting mercaptans contained in said distillate with air in contact with an alkaline solution, vanadium phthalocyanine sulfonate catalyst, mercury ion and potassium cyanide.

14. A method of treating sour kerosene which comprises reacting mercaptans contained in said kerosene with air in contact with caustic solution, cobalt phthalocyanine sulfonate catalyst, mercury ion and sodium thiosulfate.

15. A method of treating sour kerosene which comprises reacting mercaptans contained in said kerosene with air in contact with caustic solution, cobalt phthalocyanine sulfonate catalyst, mercury ion and sodium cyanide.

References Cited by the Examiner

UNITED STATES PATENTS

| | | | |
|---|---|---|---|
| 1,692,756 | 11/1928 | Moran | 208—247 X |
| 1,963,556 | 6/1934 | Morrell | 208—247 X |
| 2,671,049 | 3/1954 | Brown | 208—247 X |
| 2,882,224 | 4/1959 | Gleim et al. | 208—207 X |
| 2,966,452 | 12/1960 | Gleim | 208—206 |
| 3,128,245 | 4/1964 | Zimmerman | 208—207 X |

OTHER REFERENCES

Remy, Treatise on Inorganic Chemistry, vol. II, Elsevier Pub. Co., N.Y., 1956, pages 462–466 and 471–472.

DELBERT E. GANTZ, *Primary Examiner.*

R. H. SHUBERT, *Assistant Examiner.*